United States Patent [19]

Kaszerman

[11] 4,110,756
[45] Aug. 29, 1978

[54] CAPTURE PROTECTION FOR PULSE SIGNAL TRACKING SYSTEM

[75] Inventor: Philip Kaszerman, West Orange, N.J.

[73] Assignee: International Telephone & Telegraph Corporation, Nutley, N.J.

[21] Appl. No.: 216,518

[22] Filed: Jan. 10, 1972

[51] Int. Cl.² .............................................. G01S 9/14
[52] U.S. Cl. .................................... 343/7.3; 343/18 E
[58] Field of Search ............................. 343/7.3, 18 E

[56] References Cited

U.S. PATENT DOCUMENTS

| 3,121,869 | 2/1964 | Alpers | 343/7.3 |
| 3,267,465 | 8/1966 | Cuthbert | 343/7.3 |
| 3,267,466 | 8/1966 | Poterack et al. | 343/7.3 |
| 3,316,548 | 4/1967 | D'Amico | 343/7.3 |
| 3,597,762 | 8/1971 | DiMatteo | 343/18 E |

Primary Examiner—Malcolm F. Hubler
Attorney, Agent, or Firm—John T. O'Halloran; Peter C. Van Der Sluys

[57] ABSTRACT

This invention relates to a method of separating pulses of a particular signal source from the total signal environment. A tracking gate technique is used in which guard bands are provided on ether side of the tracking gate. The guard bands detect interfering pulses before they coincide with the pulses being tracked. Upon detection of an interfering pulse the tracking system is switched from a leading edge tracking mode to a lagging edge tracking mode or vice-versa to prevent tracking gate "capture".

3 Claims, 7 Drawing Figures

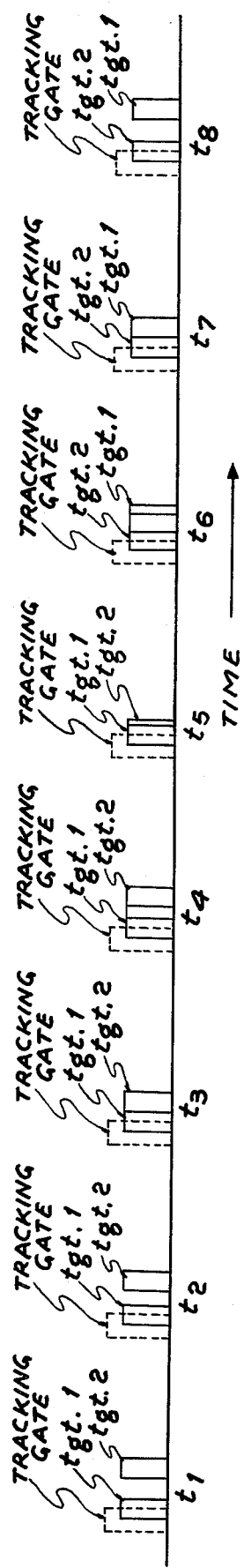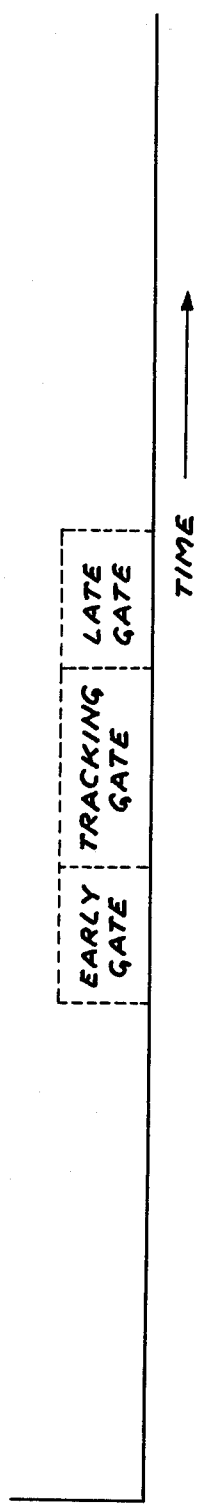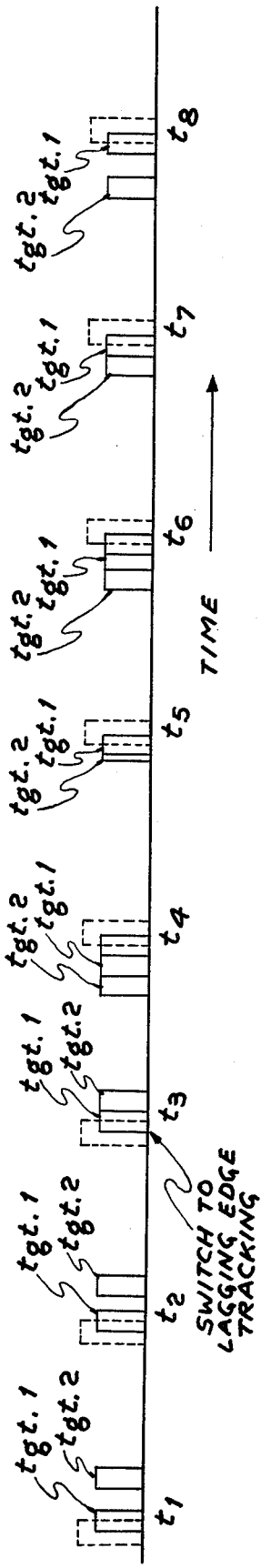

CAPTURE PROTECTION FOR PULSE SIGNAL TRACKING SYSTEM

BACKGROUND OF THE INVENTION

This invention relates to a method of separating pulses from a particular signal source from the total signal environment.

There exists a variety of situations i.e. radar, Loran, etc., in which the pulses from a particular signal source must be kept separated from the total signal environment. This is typically done by means of a tracking gate technique. However, the problem often arises of tracking gate capture or "walk off"; that is, a background signal whose pulse repetition interval (PRI) is close to that of the signal being traced can cause the tracking gate to follow it, thereby causing it to lose control of the desired signal.

SUMMARY OF THE INVENTION

It is an object of the present invention to provide a method of separating a particular signal from the total signal environment.

It is a further object of the present invention that the inventive method employ a tracking gate which is not disturbed by a second signal having a PRI close to that of the one being tracked.

According to a broad aspect of the invention, there is provided a method of separating pulses of a particular signal source from the total signal environment of the type wherein pulses are received in a receiver which passes only the leading or lagging edge of said pulses and a primary tracking gate is generated by a tracking system which allows passage of those leading or lagging edges received during the time of said tracking gate, wherein the improvement comprises generating secondary tracking gates on either side of said primary tracking gate for detecting interferring pulses before they coincide with pulses being tracked, switching said tracking system from the leading edge tracking mode to a lagging edge tracking mode when an interferring pulse is detected by secondary tracking gate occurring after said primary tracking gate, switching said tracking system from a lagging edge tracking mode to a leading edge tracking mode when an interferring pulse is detected by a secondary tracking gate occurring before said primary tracking gate.

The above and other objects of the present invention will be better understood from the following detailed description taken in conjunction with the accompanying drawings, in which:

BRIEF DESCRIPTION OF THE DRAWINGS

FIG. 2 is a timing diagram which illustrates how a tracking gate which is tracking a first target can be captured by a second target;

FIG. 6 is a timing diagram showing a tracking gate and adjacent guard bands for detecting interferring pulses according to the inventive method; and FIG. 7 is a timing diagram which illustrates the sequence of steps of the inventive method.

DESCRIPTION OF THE PREFERRED EMBODIMENT

Figure 1:
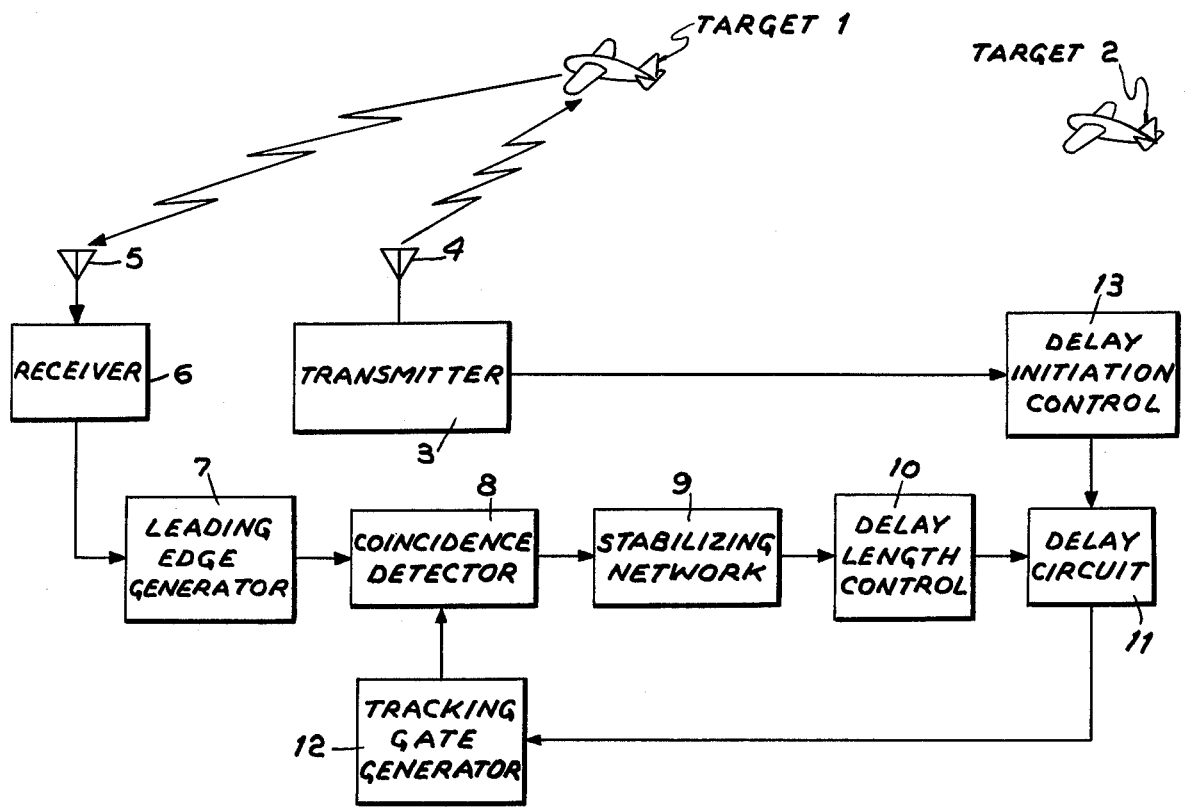
FIG. 1 is a block diagram of a typical radar tracking system.

FIG. 1 shows the range tracking system of a typical radar. Pulses are transmitted by transmitter 3 via antenna 4 and are reflected by target 1 back to antenna 5, and detected in receiver 6. The received pulse is then passed through leading edge generator 7 which recognizes and passes only the leading edge. The leading edge signal is then fed to one input of coincidence detector 8. A "range tracking gate" is the second input to coincidence detector 8. The loop is closed from the output of coincidence detector 8 through stabilizing network 9, delay length control 10, delay circuit 11, and range tracking gate generator 12. The timing is initiated by transmitter 3 which controls delay initialization control 13. Delay length control 10 determines the time interval between timing initialization and the triggering of the range gate.

If the leading edge of the received pulse coincides with the center of the tracking gate, coincidence detector 8 generates no output and therefor no input to delay length control 10. In this case, the time interval between transmitted pulse and range gate generation remains the same.

If the leading edge of the received pulse occurs before the center of the tracking gate, the output of coincidence detector 8 is such that delay length control 10 shortens the delay time between transmitted pulse and range gate. Conversely, if the leading edge of the pulse occurs after the center of the tracking gate, the output of coincidence detector 8 will act to increase the delay time from transmitted pulse to range gate. In this way, the range gate will "track" the received pulses.

Now consider the effect of target 2 shown in FIG. 1. This target need not be physically close to target 1; however, if target 2 is moving at a higher velocity than target 1, the echo pulses of target 2 will overtake those of target 1 in range as shown in FIG. 2. If the difference in velocity of the two targets is not great, and if the echo from target 2 is large enough, the two echo pulses will move together slowly as shown at time $t_1$, $T_2$, $t_3$ and $t_4$ and form a composite pulse shown at time $t_5$. Then, as the echo from target 2 moves ahead of the echo from target 1, the range gate will follow target 2 and target 1 will be lost. The circuits represented by the blocks in FIG. 1 are standard circuits, and a more detailed description of them is not deemed necessary here.

Figure 3:
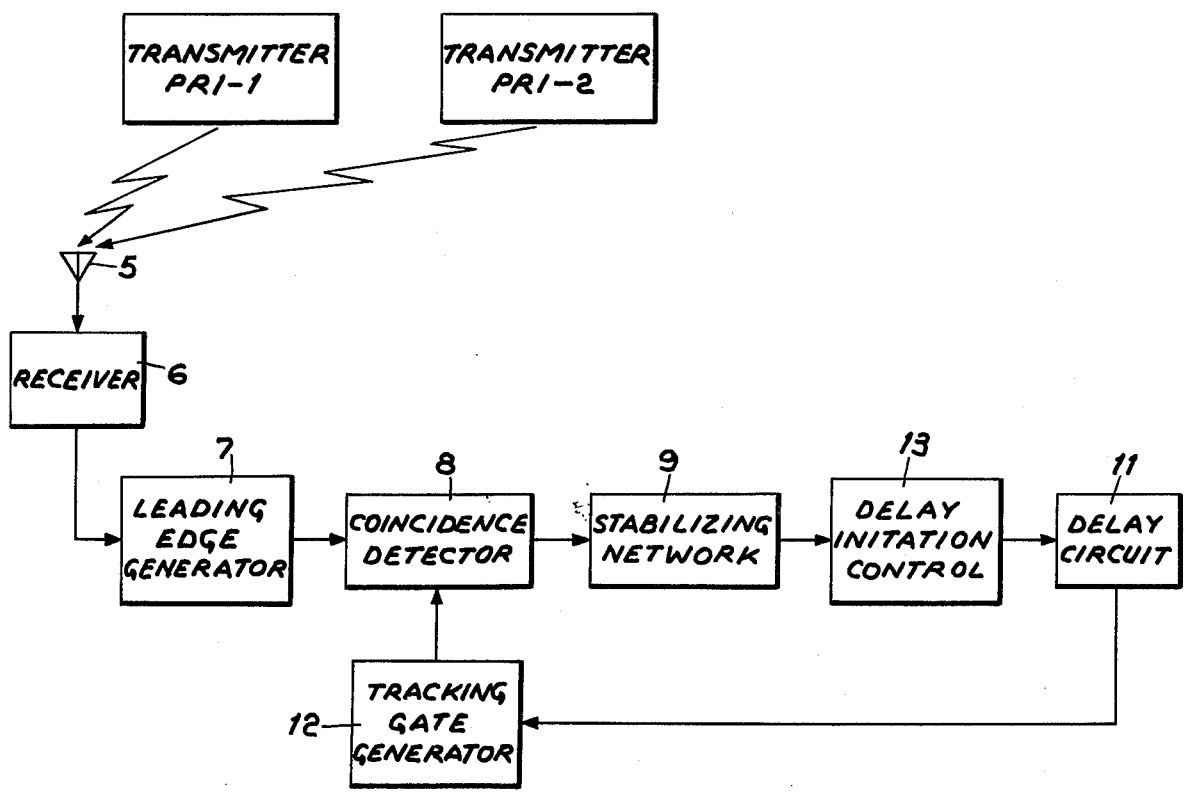
FIG. 3 is a block diagram of an arrangement where transmitting stations transmit pulses which aircraft track to determine position.

A similar situation exists for the case where transmitting stations transmit pulses to aircraft which the aircraft track to determine their position, as in Loran. A typical arrangement is shown in FIG. 3. Similar blocks have been denoted with like numerals.

In this case, the delay length, which is the time between transmitted pulses, is known but the time of arrival varies due to receiver motion. The known delay length is input to delay circuit 11. As the receiver moves, as in aircraft, the tracking gate is kept in coincidence with the leading edge of the received pulse by varying the initiation of delay.

As in the above example, this system is susceptible to tracking gate "walk off" by an undesired signal. The undesired signal could be generated by a second transmitted whose PRI is very, close to that of the first. The tracking gate "walk off" can again be depicted as in FIG. 2, with the interferring signal being generated by a second transmitter.

Figure 4:
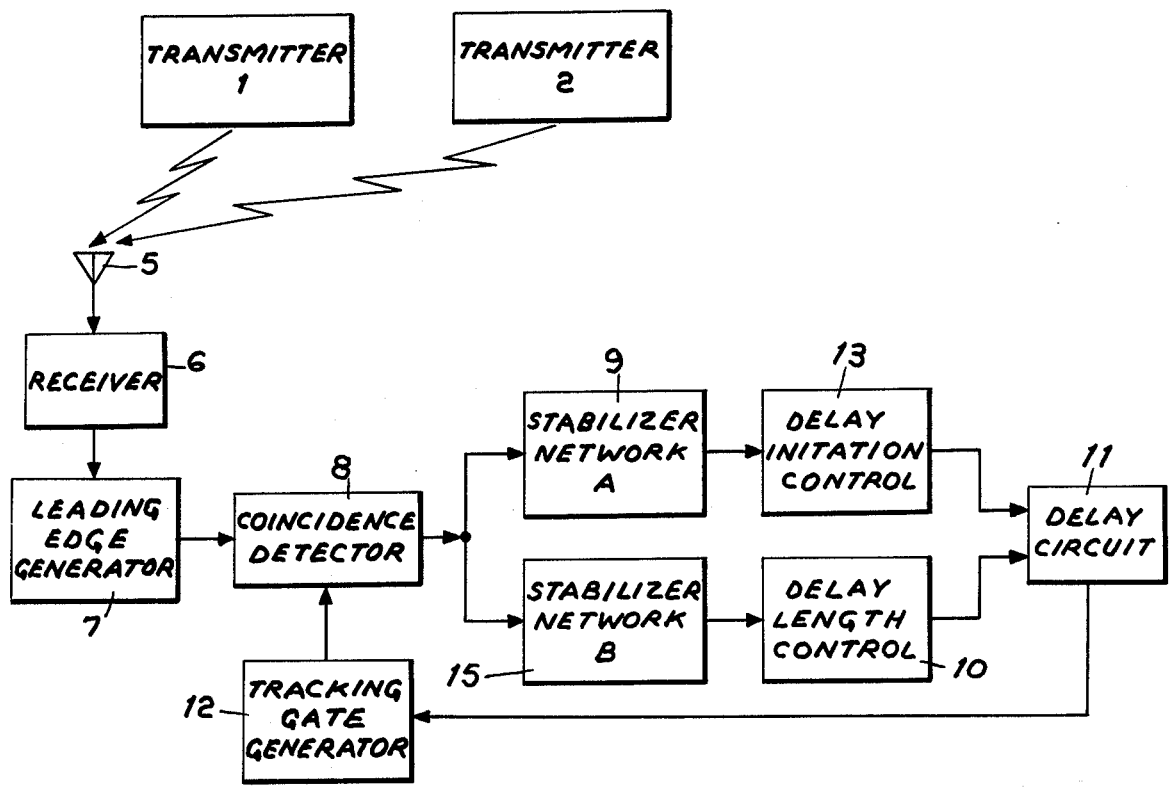
FIG. 4 is a block diagram of an arrangement in which a receiver system must track a signal, whose PRI is not known, from a moving or stationary transmitter.

A third situation is shown in FIG. 4. Here, the system must track a transmitter, which may be moving or stationary, whose PRI is not known. An example would be the case of a ground station tracking airborne TACAN transmitters. Thus, the initialization of delay and the delay length must both be controlled. The delay initialization can be controlled quickly; i.e. on a pulse-to-pulse basis. However, the delay length is controlled on a long term basis using the measurement of many pulse-to-pulse intervals. To this end, averaging network 15 is employed. The sysstem shown in FIG. 4 is also susceptible to capture by the pulses of a second transmitter whose PRI is nearly equal to that of the first transmitter or which has the same PRI and is overtaking the first in range. The capture situation is again as shown in FIG. 2.

In all of the above described arrangements, capture can be prevented. Secondary tracking gates or "guard bands", shown in FIG. 6, are provided to detect interferring pulses before they coincide with the pulses being tracked. The "guard bands" are additional gates on either side of the tracking gate.

Figure 5:
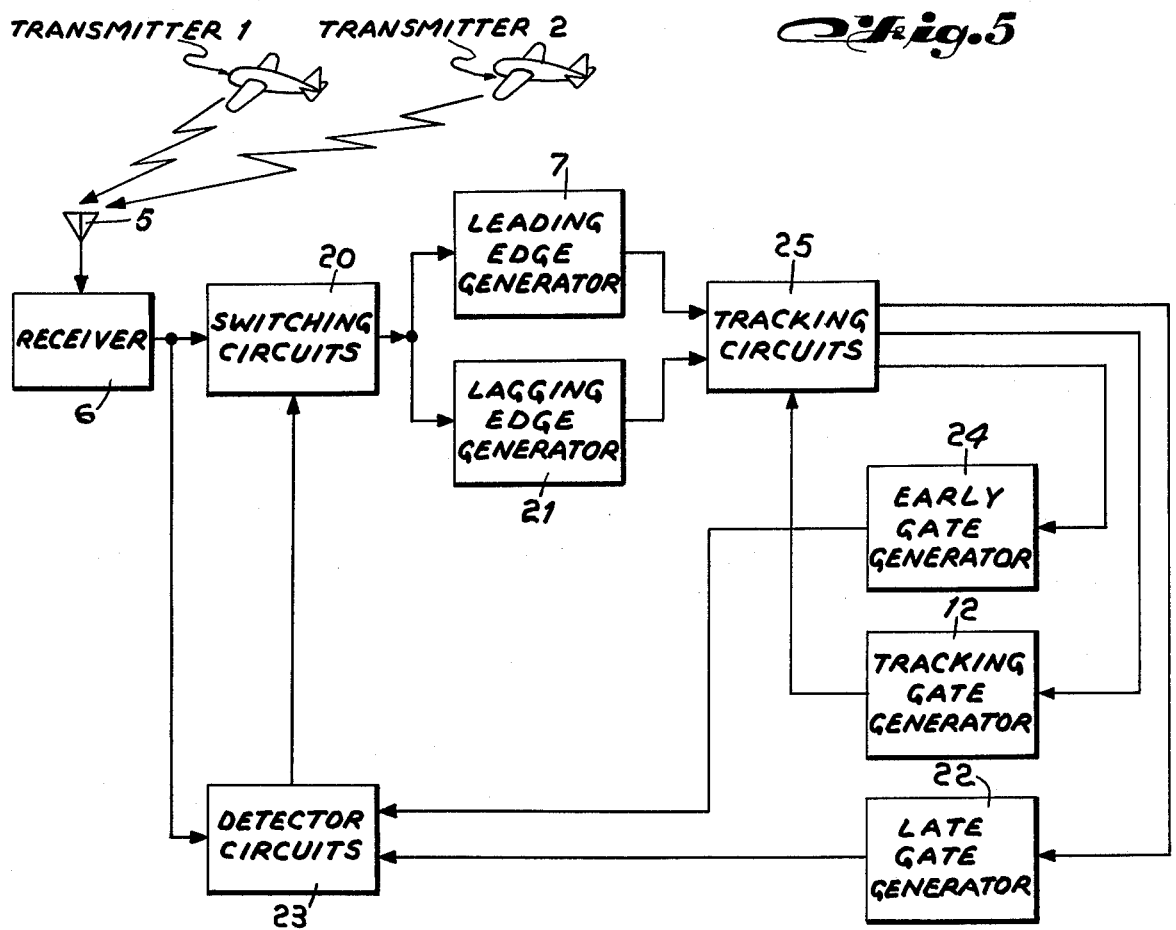
FIG. 5 is a block diagram of an arrangement for carrying out the inventive method.

A "late gate" triggered by the tracking circuit 25, opens just after the tracking gate. An "early gate", also triggered by the tracking circuit 25 opens just before the tracking gate. Both the "early gate" and "late gate" monitor the output of receiver 6 in FIG. 5. Like blocks are denoted by like reference numerals. Now consider the original situation shown again in FIG. 7. As the pulses from the second target approach the pulses from target 1 ($t_1$ and $t_2$), they will be detected by the "late gate" generated by late gate generator 22. Upon detection by detector circuit 23, the system shown in FIG. 5 switches to lagging edge detection ($t_3$) by means of switching circuit 20 and lagging edge generator 21. At most, the switch to lagging edge detecton produces a jump in the position of the tracking gate. A means of minimizing the effect of the jump is switching to lagging edge racking after the interferring pulse has passed the late gate.

Additionally, several late gates and/or tracking systems associated with the late gate can be used to monitor the relative velocities of the desired pulse and the interferring pulse to allow switching from leading to lagging edge tracking with a minimum of description to the tracking function.

Now that the tracking system is following the lagging edge of the pulse, it is susceptible to capture by a pulse overtaking the desired pulse from the other direction. However, the early gate, generated by early gate generator 24, now functions in the same manner as the late gate to switch the system from lagging edge tracking back to leading edge tracking if an interferring pulse should appear.

It should be noted that other features of the pulse can be used in place of the leading or lagging edge. For instance, in the case of a Loran signal, one could use different zero crossings of the carrier for tracking.

It is to be understood that the foregoing description of specific examples of this invention is made by way of example only and is not to be considered as a limitation on its scope.

I claim:

1. A method of separating pulses of a particular signal source from the total signal environment of the type wherein pulses are received in a receiver which passes only the leading or lagging edge of said pulses and a primary tracking gate is generated by a tracking system which allows passage of those leading or lagging edges received during the time of said tracking gate, wherein the improvement comprises:

generating secondary tracking gates on either side of said primary tracking gate for detecting interferring pulses before they coincide with pulses being tracked;

switching said tracking system from a leading edge tracking mode to a lagging edge tracking mode when an interferring pulse is detected by a first secondary tracking gate occurring after said primary tracking gate;

switching said tracking system from a lagging edge tracking mode to a leading edge tracking mode when an interferring pulse is detected by a second secondary tracking gate occurring before said primary tracking gate.

2. A method according to claim 1 wherein said switching from leading edge tracking mode to lagging edge tracking mode occurs after said interferring pulse has passed through said first secondary tracking gate.

3. A method according to claim 1 wherein said switching from lagging edge tracking mode to leading edge tracking mode occurs after said interferring pulse has passed through said second secondary tracking gate.

* * * * *